United States Patent [19]

Kaneyuki et al.

[11] Patent Number: 4,839,576
[45] Date of Patent: Jun. 13, 1989

[54] CONTROLLER FOR AC GENERATOR IN VEHICLES

[75] Inventors: Kazutoshi Kaneyuki; Shiro Iwatani, both of Hyogo, Japan

[73] Assignee: Mitsubishi Denki Kabushiki Kaisha, Tokyo, Japan

[21] Appl. No.: 160,417

[22] Filed: Feb. 25, 1988

[30] Foreign Application Priority Data

Feb. 26, 1987 [JP] Japan ............................ 62-29321[U]

[51] Int. Cl.$^4$ ................................................. H02J 7/14
[52] U.S. Cl. ........................................ 322/25; 322/28; 320/64
[58] Field of Search ........................ 322/25, 28; 320/64

[56] References Cited

U.S. PATENT DOCUMENTS

| | | | |
|---|---|---|---|
| 4,459,489 | 7/1984 | Kirk et al. | 322/8 X |
| 4,629,968 | 12/1986 | Butts et al. | 322/28 X |
| 4,670,704 | 6/1987 | Maehara et al. | 322/28 X |
| 4,680,529 | 7/1987 | Komurasaki et al. | 322/28 |
| 4,682,044 | 7/1987 | Hotate et al. | 322/28 X |

Primary Examiner—R. J. Hickey
Attorney, Agent, or Firm—Bernard, Rothwell & Brown

[57] ABSTRACT

A controller for an AC power generator in vehicles having a rectifier for rectifying an AC output of an AC power generator equipped with a field coil, a battery charged with a rectified output of the rectifier, and a voltage regulator for adjusting an output voltage of the AC power generator by controlling a current flowing through the field coil to turn on and off; the voltage regulator being equipped with a detecting portion to detect the field current flowing through said field coil; and further comprising a field current controller, having a reference voltage supplying portion which generates a reference voltage to determine the field current by charging a set value which depends on the intermittent condition of the field current of the voltage regulator on the basis of a larger time constant than that of the field coil, and a comprising and controlling portion which compares each output of the detecting portion for a field current and the reference voltage supplying portion so as to control the voltage regulator to change successively a conductive condition of the field coil; whereby the field current can be increased slowly.

12 Claims, 4 Drawing Sheets

CONTROLLER FOR AC GENERATOR IN VEHICLES

BACKGROUND OF THE INVENTION

1. Field of the Invention

This invention relates to a controller for an alternating current (AC) generator in vehicles that can restrict the change of engine rotating speeds and compensate the shock against a bearing fixed on the shaft of the engine or the AC generator when an electric load is switched on.

2. Description of the Prior Art

FIG. 1 illustrates a circuit diagram of the conventional controller for AC generator in vehicles, wherein numeral 1 shows an AC generator comprised of an armature coil 101 and a field coil 102 to be driven by an engine mounted on a vehicle, which is not shown in the diagram.

And numeral 2 shows a rectifier having a main output terminal 201, an auxiliary output terminal 202, and a ground terminal 203 so as to rectify in full wave the AC output of the generator 1. The main output terminal 201 is to supply a main output; and then the auxiliary output terminal 202 is to energize the field coil 102 and add a rectified output voltage of the generator 1 to a voltage regulator 3, which will be described later.

The voltage regulator 3 that controls the output voltage of the generator 1 to a predetermined value comprises the following parts: a serial circuit of resistors 301 and 302 is connected between the auxiliary output terminal 202 of the rectifier 2 and the ground, and the resistors 301 and 302 are used for dividing the output voltage of the auxiliary output terminal 202.

A connecting point of resistors 301 and 302 is connected to the base of a transistor 304 through a zener diode 303, and the transistor 304 is turned on or off according to the conductive or non-conductive condition of the zener diode 303.

An emitter of the transistor 304 is connected to the ground and a collector of the transistor 304 is connected to the base of an output transistor 305. The collector of the transistor 304 is connected to the auxiliary output terminal 202 through a base resistance 306. In the output transistor 305, an emitter is grounded and a collector is not only connected to the auxiliary output terminal 202 through a diode 307 but connected to the terminal 202 through the field coil 102.

The output transistor 305 is controlled to be conductive or non-conductive by the transistor 304 so as to regulate a field current of the field coil 102.

The diode 307 is connected in parallel with the field coil 102, absorbing a surge current generated by the connection and disconnection of the field coil 102.

As for a battery 4, a minus terminal is grounded, and a plus terminal is connected to the auxiliary output terminal 202 through a key switch 7 and an indication lamp 8.

The main output terminal 201 of the rectifier 2 is not only connected to the plus terminal of the battery 4, but grounded through a load switch 6 and an electric load 5.

FIG. 2 is a characteristic diagram showing the operational waveform of each part of the conventional controller. Every operating condition is illustrated in the figure, from a small electric load until the load that should have the maximum output power of the AC generator 1 is connected. The axis of abscissa represents time.

FIG. 2(a) shows operational waveforms made by the connection and disconnection of the output transistor 305 of the voltage regulator 3. FIG. 2(b) is a field current waveform of the AC generator 1, FIG. 2(c) an output current waveform of the AC generator 1, and FIG. 2(d) a driving torque waveform of the AC generator 1; point (A) indicates a time when the electric load that requires the maximum output is switched on.

Now, the operation of the conventional device is described referring to FIG. 1. When the key switch 7 is closed on starting the engine, an initial exciting current flows through the key switch 7, from the battery 4 to the indication lamp 8 and the field coil 102. Therefore, the AC generator 1 is ready for generating power, but the indication lamp 8 is lighted on to indicate that the electric power is not being generated.

When the engine is started, the AC generator 1 begins to supply an electric power, increasing the voltage of the auxiliary output terminal 202 of the rectifier 2, and, at the same time, decreasing a potential difference across the indication lamp 8. This difference, at last, becomes zero, which switches off the indication lamp 8 so as to show the electric power being generated normally by the AC generator 1.

The voltage regulator 3 detects the output voltage of the auxiliary output terminal 202 of the rectifier 2 by using the zener diode 303 and the resistances 301 and 302 for voltage dividing. Thus, when the output voltage of the auxiliary output terminal 202 exceeds the value preset by the resistances 301 and 302 and zener diode 303, the diode 303 becomes conductive so as to turn on the transistor 304.

When, on the other hand, the output voltage of the auxiliary output terminal 202 is equal to or less than the above preset value, the zener diode 303 becomes nonconductive; thus, the transistor 304 is turned off.

As, in this manner, the output transistor 305 is turned on or off in accordance with the connection or disconnection of the transistor 304, the field current is controlled to flow into or be cut off from the field coil 102. Therefore, the output voltage of the AC generator 1 is regulated to the predetermined value.

In the conventional controller constructed as above, when the AC generator 1 is being operated in a condition of a small load and then the electric load 5 is switched on by the load switch 6 so that the maximum output is required as shown in FIG. 2 shown as the point (A)), the output voltage of the AC generator 1 becomes less than the predetermined value so that the output transistor 305 of the voltage regulator 3 is turned on instead of the preceding on and off condition.

Therefore, the field current of the AC generator 1 increases according to the time constant of the field coil 102 (ca. 100 msec.) until it reaches the maximum field current (FIG. 2(b)). Then the output current of the AC generator 1 reaches its maximum value by its operation proportional to the field current (FIG. 2(c)), and therefore the driving torque reaches its maximum value under the present condition (FIG. 2(d)). That is, when the electric load 5 is switched on by using the load switch 6, it increases the field current, in proportion to which the output current and the driving torque increase. The increasing rate is determined by the time constant that is characteristic of the field coil 102, 100 msec. or less in general.

Therefore, the driving torque of generator 1 increases within an interval about 100 msec. so that the load of the engine goes up suddenly to drive the AC generator 1; this leads to an unstable condition of the engine rotating speed. Moreover, as the engine and the AC generator 1 are connected by using a V belt or the like in general, a sudden change of the load will lead to slippage of the belt, generate creaking noises, and shorten its lifetime. Furthermore, the sudden change of the load adds the stress to the bearings of the engine driving shaft and the rotor of the AC generator 1, so we have a disadvantage which affects the lifetime of the bearings.

Since the controller of the conventional AC generator in vehicles is constructed as described above, there are the troubles that, when a large electric load is connected to the AC generator 1, a sudden change of the driving torque causes the engine rotating speed to become unstable, the V belt which connects the engine and the AC generator to slip and make noises, its lifetime to shorten, or affects the bearings mounted on the shafts of the engine and the AC generator.

SUMMARY OF THE INVENTION

The object of the present invention is to provide a controller for the AC generator in vehicles, which can not only restrict the changes of engine rotating speed and prevent the slippage of the V belt even if a large electric load is connected to the AC generator, but can compensate the shock against the bearings mounted on the shafts of an engine or an AC generator.

The inventive controller for the AC generator in vehicles includes a means to detect a field current of an AC generator; a reference voltage setting means to determine the field current, its set value being changed by switching on or off of the field current flowing through the AC generator; and a field current controller which changes the conductivity of the field coil successively by using an output obtained when comparing the outputs from said two means.

DETAILED DESCRIPTION OF THE PREFERRED EMBODIMENT

Figure 3:
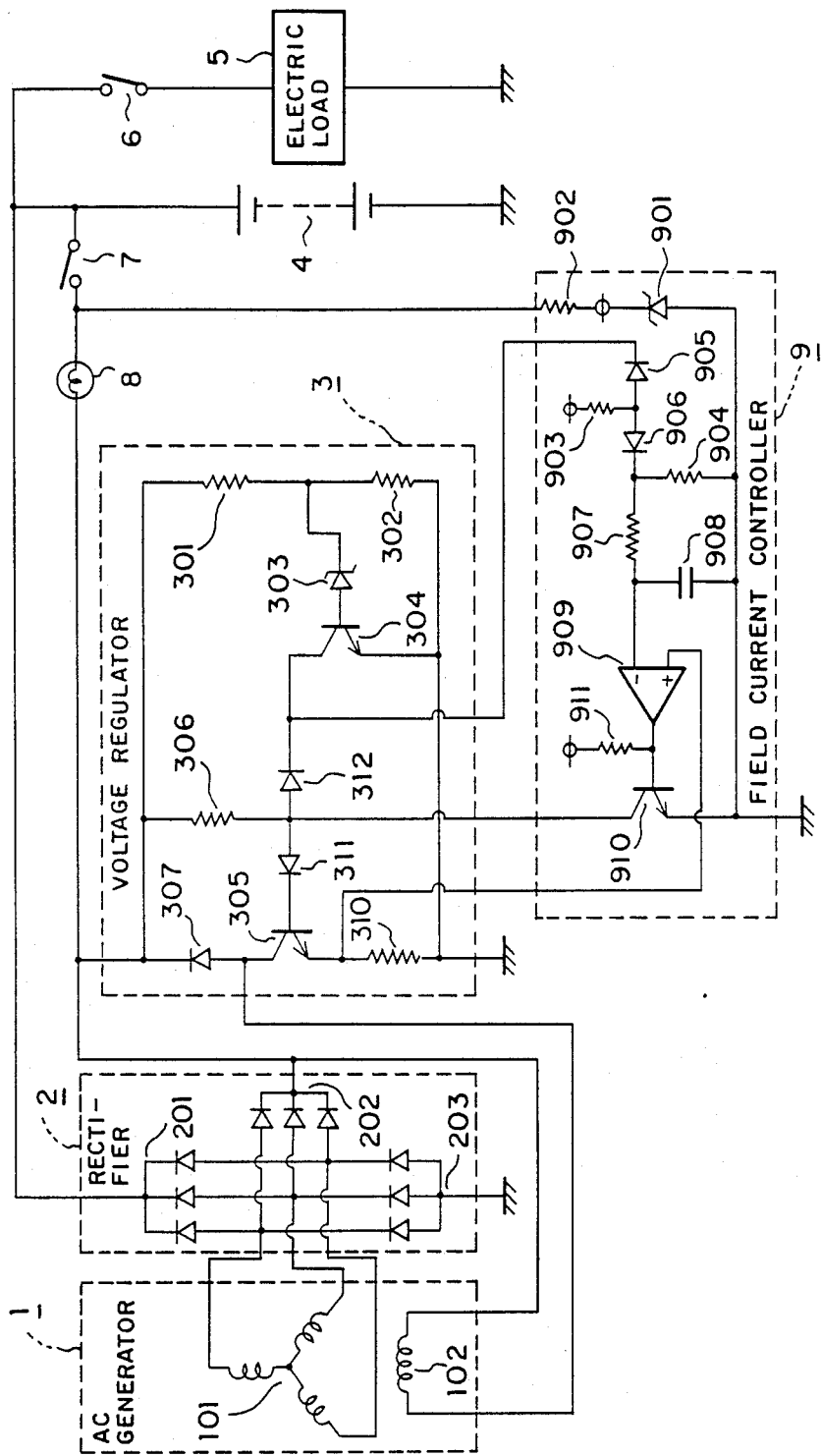
FIG. 3 is a circuit diagram of one embodiment of the inventive controller for the AC generator in vehicles.

Referring now to the figures, we will describe a preferred embodiment of the inventive controller for the AC power generator in vehicles. FIG. 3 is a circuit diagram illustrating the construction of the embodiment. In FIG. 3, the same numerals are used for the same parts as the ones already shown in FIG. 1 and their descriptions are omitted here, and therefore the parts that are not shown in FIG. 1 will be explained in detail.

Figure 1:
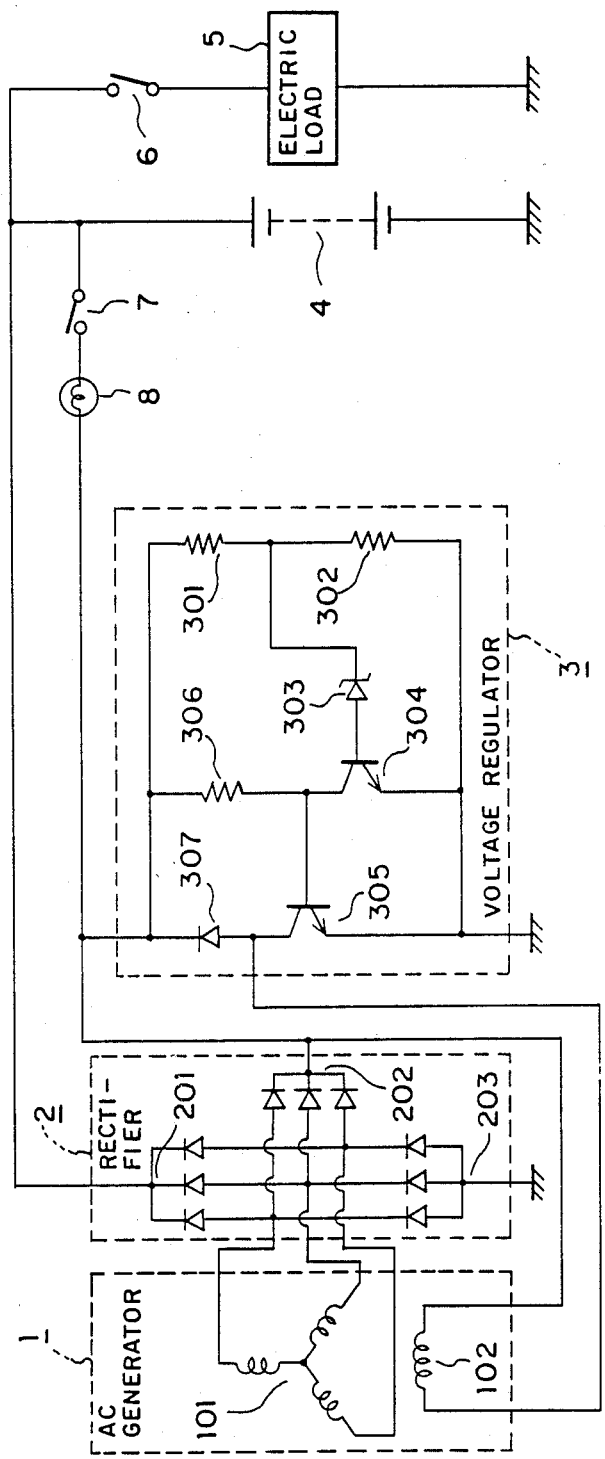
FIG. 1 is a circuit diagram of the conventional controller for the AC generator in vehicles.

In FIG. 3, a part of the voltage regulator 3 in FIG. 1 is changed, and then a field current controller 9 is added to the construction of FIG. 1.

That is, in a voltage regulator 3, separating diodes 311 and 312 are connected between the collector of transistor 304 and the base of output transistor 305, with the anodes of the diodes connected with each other. A connecting point of the anodes of separating diodes 311 and 312 is connected to auxiliary output terminal 202 of rectifier 2 through base resistance 306. And the emitter of the output transistor 305 is connected to the ground through a resistor 310 used for detecting the field current.

In the field current controller 9, a serial circuit of a resistor 902 and a zener diode 901 that constitutes a constant voltage source is connected between the ground and the connecting point of key switch 7 and indication lamp 8.

A minus input terminal of a comparator 909 is connected to the collector of a transistor 304 through a resistor 907 and diodes 906 and 905; the diodes 905 and 906 are used for preventing a back current. A voltage dividing resistor 903 is connected between the power supply and the connecting point of the anodes of the diodes 905 and 906 used for preventing a back current.

A contact point of the back-current preventing diode 906 and the resistor 907 is connected to the ground through a voltage dividing resistor 904, and the minus input terminal of the comparator 909 is grounded through a capacitor 908.

The above voltage dividing resistors 903 and 904 divide a constant voltage generated from the zener diode 901 and are connected to the minus input terminal of the comparator 909 through the resistor 907 so as to generate a reference voltage of the comparator 909. The capacitor 908 and the resistor 907 constitute a time constant circuit for charging and discharging.

A plus input terminal of the comparator 909 is connected to the emitter of the output transistor 305. The output terminal of the comparator 909 is connected to the base of a transistor 910. The base of the transistor 910 is connected to the power supply through a base resistance 911.

The transistor 910 is used for controlling the turning on and off of the output transistor 305 of the voltage regulator 3.

Figure 2:
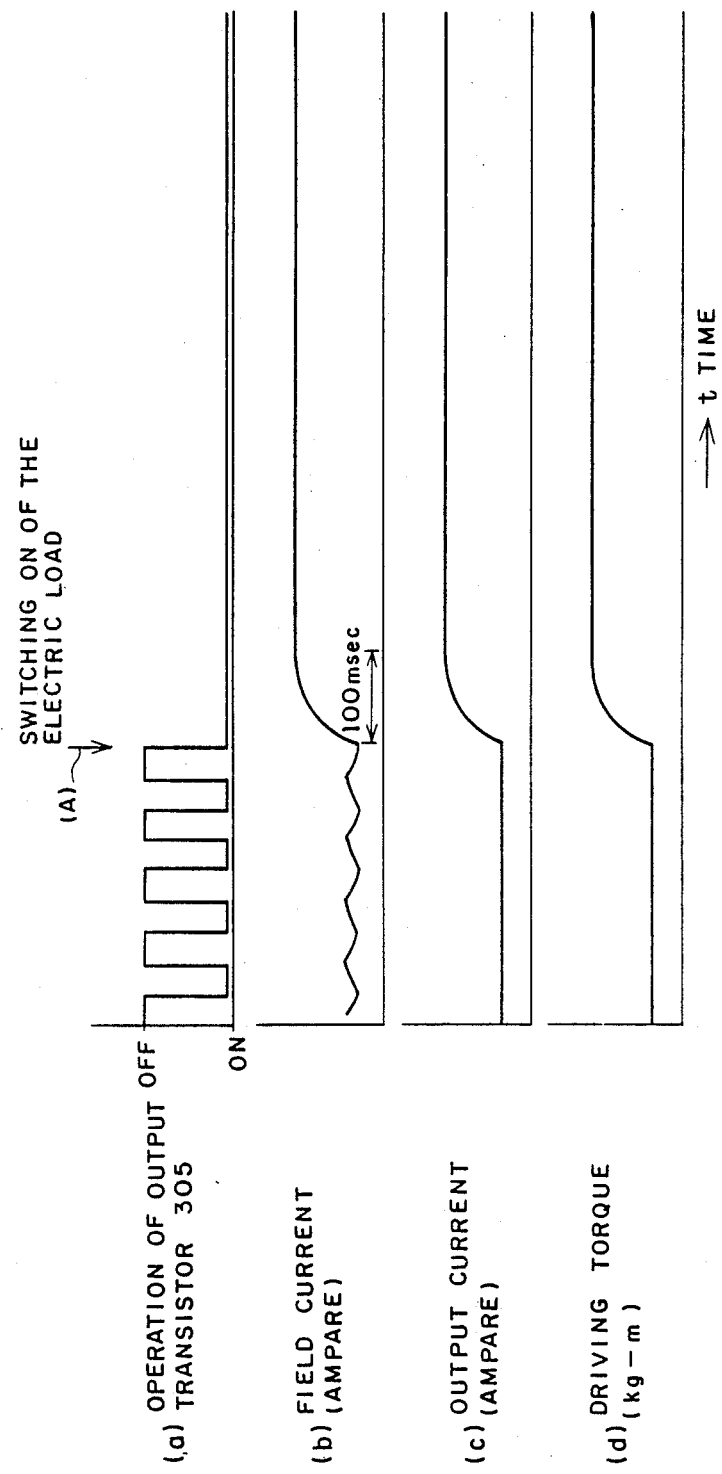
FIG. 2 shows characteristic diagrams of the operational waveform of each part of the controller illustrated in FIG. 1.
Figure 4:
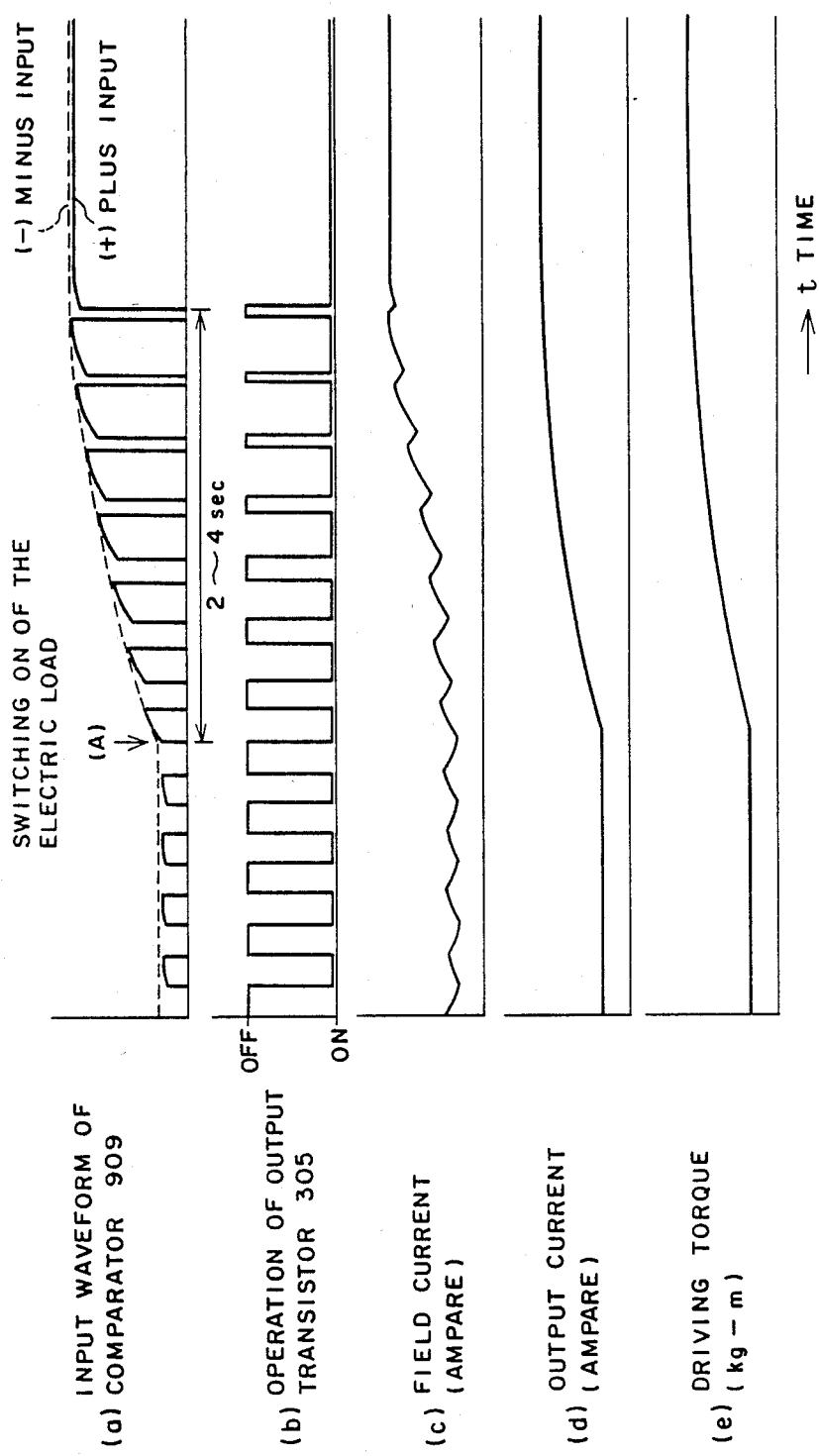
FIG. 4 shows a characteristic diagram of the operational waveform of each part of the above embodiment illustrated in FIG. 3.

FIG. 4 shows characteristic diagrams of the operational waveform of each part in the above mentioned embodiment of the present invention, and, in the same way as the conventional controller shown in FIG. 2, every operating condition is illustrated in the figure, from a small electric load until the load that should have the maximum output power of the AC generator 1 is switched on.

FIG. 4(a) is an input waveform of the comparator 909 of the field current controller 9. FIG. 4(b), FIG. 4(c), FIG. 4(d), and FIG. 4(e) correspond to FIG. 2(a), FIG. 2(b), FIG. 2(c), and FIG. 2(d), respectively.

The operations of the controller shown in FIG. 3 will now be described. As the usual voltage adjusting operations are the same as those of the conventional controller, their explanation is omitted here. And in this case, the voltage dividing resistors 903 and 904 are set in such a way that, in the condition of constant load, the output transistor 305 to turn on and off the field current is controlled only by the operation of the transistor 304, that is, the comparator 909 of the field current controller 9 is maintained in "low" operating condition.

And the time constant circuit, comprising the capacitor 908 and the resistor 907, and being connected to the minus input terminal of the comparator 909, is set to have a sufficiently larger value of time constant (ca. 2-4 sec.) than that of the field coil 102.

Therefore, when the AC generator 1 is being operated with a small load and then an electric load 5 that should have the maximum output is switched on using the load switch 6, as shown in FIG. 4 (FIG. 4(a), point (A)), the output voltage of the AC generator 1 becomes equal to or less than the predetermined value so that the transistor 304 of the voltage regulator 3 is maintained in the non-conductive condition instead of the preceding on and off operation.

In this case, the voltage added to the minus input terminal of the comparator 909 in the field current controller 9 starts to increase, as shown in FIG. 4(a), toward the final reference voltage set by the voltage dividing resistors 903 and 904; this process is done with the time constant determined by the capacitor 908 and the resistor 907 from the time when the transistor 304 becomes non-conductive.

On the other hand, the output transistor 305 becomes conductive as shown in FIG. 4(b), and the field current starts to increase as shown in FIG. 4(c). It is detected by the resistor 310 used for the field current detection and supplied to the plus input terminal of the comparator 909 as shown in FIG. 4(a). Then, as the time constant to increase the field current is smaller than that of the comparator 909 to increase the reference voltage, the voltage level of the comparator 909 changes from "low" to "high" when both inputs of the comparator 909 have the same value. This causes the output transistor 305 to become non-conductive and to decrease the field current.

Therefore, the voltage level of the comparator 909 changes from "high" to "low" so that the field current begins to increase; in this case, the current increases much according to the rise of the reference voltage of the comparator 909. Such a procedure is repeated hereafter so that the field current gradually increases until the maximum value is attained (FIG. 4(c)). In proportion to the increase of the field current, the output current of the AC generator 1 (FIG. 4(d)) and driving torque (FIG. 4(e)) gradually increase, too.

That is, an increase of the field current can be compensated by controlling with the reference voltage rising time constant (2-4 sec.) of the field current controller 9; an increase of the driving torque of the AC generator 1 can be slowed down; the rotating speed changes of the engine that drives the AC generator 1 can be restricted when a large electric load is switched on, and this leads to prevent slippage and creaking noises of the V belt which connects the engine and the AC generator; thus, the lifetime of the belt is not reduced. Moreover, shocks against the bearings of the shafts of the AC generator 1 can be absorbed.

Although this invention has been described in reference to the condition that an electric load is switched on to require the maximum output of the AC generator 1 during its operation with a small load, the inventive effect can be obtained not only for connecting the maximum load but for any other load; and the maximum effect is obtained when the maximum load is connected.

In this invention, as described above, an increase of the field current is compensated by the field current controller when an electric load is switched on, thus compensating the increase of the driving torque, therefore, the changes of the engine rotating speeds are restricted, preventing slippage and the shortening of the lifetime of the V belt that is connected to the engine, and shocks against the bearings mounted on the shafts of the engine and the AC generator can be absorbed.

What is claimed is:

1. A controller for an alternating current (AC) generator having a field coil in vehicles, the controller comprising in combination a battery charged with a rectified output of the AC generator;

a voltage regulator including means for detecting an output voltage of said AC generator to produce an output when the output voltage exceeds a predetermined voltage, and means for adjusting the output voltage of said AC generator by controlling a field current through the field coil of said AC generator; and a field current controller including time delay means responsive to the output of the detecting means, field current detecting means for determining the field current, and means for comparing an output of said time delay means with an output of said field current detecting means and for operating said adjusting means so as to change the field current in said field coil with a time constant greater than a time constant of said field coil.

2. A controller for an AC generator in vehicles according to claim 1, wherein said adjusting means includes an output transistor in series with the field coil; and said field current controller comprises a constant voltage generating circuit connected in series between the output of said AC generator and ground; a charging and discharging time constant circuit connected to said constant voltage generating circuit and to the detecting means of the voltage regulator; a comparator circuit for receiving an output of said time constant circuit and an emitter output of said output transistor and for comparing said two outputs; and a control circuit for supplying a control output to the base of said output transistor in accordance with an output of said comparator circuit.

3. A controller for an AC generator in vehicles according to claim 1, wherein said voltage regulator comprises at least an output transistor for controlling a field current of said field coil, and a resistor for detecting a field current, said resistor being connected between the emitter of said output transistor and ground, and said field current controller comprises a constant voltage generating circuit connected between said output of said AC generator and ground, a charging and discharging time constant circuit connected to said voltage generating circuit, a comparator circuit for comparing an output from said time constant circuit and an output from the connecting point of the emitter and said resistor, and a control circuit for supplying a control output to the base electrode of said output transistor by using an output of said comparator circuit.

4. A controller according to claim 2 or 3, wherein said constant voltage generating circuit and said charging and discharging time constant circuit function as the time delay means, and said comparator circuit functions as at least a part of the field current detecting means and the comparing means.

5. A controller according to claim 2 or 3, wherein said constant voltage generating circuit comprises a zener diode having a resistor connected in series therewith.

6. A controller according to claim 2 or 3, wherein said charging and discharging time constant circuit comprises a capacitor and a resistor connected in parallel with each other.

7. A controller according to claim 2 or 3, wherein said comparator circuit comprises a comparator; and said control circuit comprises a control transistor for turning on and off said output transistor.

8. A controller for an AC power generator in vehicles, comprising a rectifier to rectify an AC output of the AC generator which has a field coil; a battery charged with an output of said rectifier; a voltage regulator for adjusting an output voltage of said generator, wherein said voltage regulator includes means for detecting the output voltage of said generator, means for controlling a field current of said generator, and field current detecting means for detecting the field current flowing through said field coil; and a field current controller having a delay reference voltage supplying means which comprises a constant voltage generating circuit connected in series with said output of the rectifier and a charging and discharging time constant circuit connected to said voltage generating circuit for supplying a delay reference voltage, and comparing and controlling means for comparing a detected output of said field current detecting means with said delay reference voltage from said reference voltage supplying means and for operating said controlling means of the voltage regulator to control the field current to be always less than the delay reference voltage.

9. A controller according to claim 8; wherein said voltage regulator comprises an output transistor for turning on and off the field current supplied from said field coil; and said means for detecting the field current comprises a resistor for detecting the field current, said resistor being connected between the emitter of said output transistor and the ground.

10. A controller according to claim 8; wherein said reference voltage supplying means comprises a serial circuit of a zener diode and a resistor for functioning as said constant voltage generating circuit, and comprises a parallel circuit of a capacitor and a resistor for functioning as said charging and discharging time constant circuit.

11. A controller according to claim 8; wherein said comparing and controlling means comprises a comparator having non-inverting and inverting input terminals and which compares a detected output from said field current detecting means as an input of said non-inverting terminal with the delay reference voltage output from said reference voltage supplying means as an input of said inverting terminal; and a driving transistor which drives and controls an output transistor which turns on and off said field coil of said voltage regulator on the basis of a compared output of said comparator.

12. A controller according to claim 8; wherein said reference voltage supplying means of said field current controller further comprises two diodes for preventing a back current.

* * * * *